Patented Oct. 20, 1953

2,656,346

UNITED STATES PATENT OFFICE 2,656,346

DIS- AND POLYAZO DYESTUFFS AND A PROCESS OF MAKING SAME

Oscar Knecht and Hans Ischer, Basel, Switzerland, assignors to Sandoz Limited, Basel, Switzerland, a Swiss firm No Drawing. Application June 26, 1950, Serial No. 170,460. In Switzerland January 17, 1947

14 Claims. (Cl. 260—159)

This is a continuation-in-part of our copending patent application Ser. 2,123, filed on January 13, 1948.

The present invention relates to new and valuable dis- and polyazo dyestuffs and to a process for their production. The new dyestuffs are obtained by treating acylamino azo dyestuffs of the formula

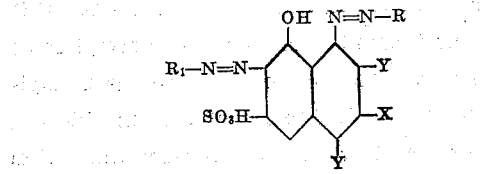

wherein R and $R_1$ represent residues of unsubstituted or substituted aryl or heterocyclic compounds, X stands for a member of the group consisting of hydrogen and $-SO_3H$, one of the Y's meaning hydrogen and the other Y being

and R' meaning a member of the group consisting of hydrogen, alkyl, cycloalkyl, aralkyl, aryl and acyl, with saponifying agents in order to convert the

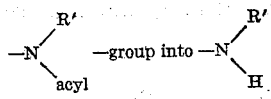

The azo dyestuffs used as starting material may be prepared for instance in the manner described in the aforesaid copending application (acylamino-dis- and polyazo dyestuffs). Thus, these starting dyestuffs may be prepared by coupling any desired diazo compound in an acid medium with an hydroxy-acyl-amino azo-dyestuff obtained by treating with an acylating agent azo dyestuffs of the formula

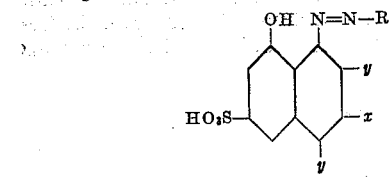

wherein R has the precedingly-indicated significance, x stands for a member of the group consisting of hydrogen and $-SO_3H$ and one of the y's means hydrogen and the other $-NHR'$, R' representing a member selected from the group consisting of hydrogen, alkyl, cycloalkyl, aralkyl and aryl, and treating subsequently with saponifying agents to split off the acyl residue attached to the 8-hydroxy group.

The expression "acyl" denotes the acid radical of organic or inorganic acids such as formic acid, carbamic acid, carbonic acid-monomethylester, acetic acid, chloroacetic acid, butyric acid, stearic acid, benzoic acid, nitrobenzoic acids, anisic acids, cinnamic acid, naphthoic acids, alkyl- and arylsulfonic acids, further the acid radical of a polybasic acid such as carbonic acid, oxalic acid, cyanuric acid, phthalic acid, succinic acid and the like.

The saponification may be performed by a treatment with saponifying agents such as sodium carbonate, ammonia, sodium hydroxide, barium hydroxide, acetic acid or mineral acids at ordinary or at elevated temperatures. If the new dyestuffs contain groups being capable of forming complex metal compounds they can be treated in substance or on fibres with metal-yielding agents such as chromium acetate, copper sulfate and the like. According to the nature of the residue R and $R_1$ the new dyestuffs can be used for dyeing animal, vegetable or synthetic fibres or leather, whereby shades of good fastness properties to light and to washing and in some cases of good fastness properties to milling are obtained.

The following examples, without being limitative, illustrate the present invention, the parts being by weight:

Example 1

70.8 parts of the disazo dyestuff

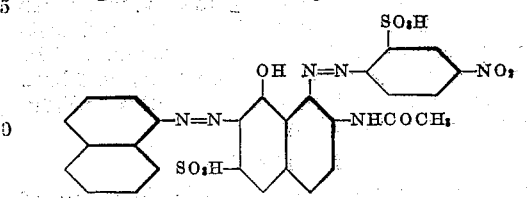

are heated to 80–90° C. for a short time in a 1% sodium hydroxide solution. After neutralizing the amino-disazo dyestuff is salted out, filtered off and dried at 90° C. The thus obtained primary disazo dyestuff of the formula

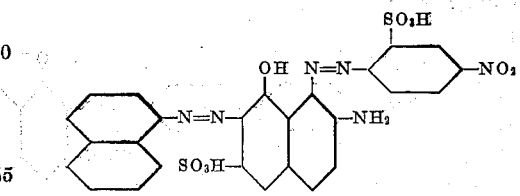

is a dark powder dyeing wool from an acid bath in deep brown shades of good fastness to light and excellent fastness to perspiration and to washing.

Example 2

72 parts of the acetylaminodisazo dyestuff

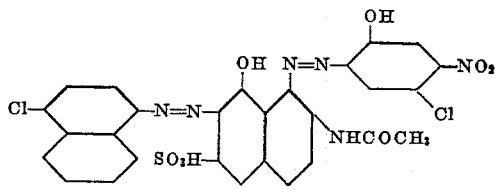

are dissolved in a 10% sodium carbonate solution and heated for three hours at a temperature of 90° C. until the acetyl radical is split off. Then the amino-dyestuff is salted out, filtered and dried in vacuo at 90° C. The new dyestuff gives, when dyed on wool from an acid bath, red brown shades which, when after-chromed with sodium bichromate, change to deep brown-olive.

Example 3

85 parts of the polyazo dyestuff

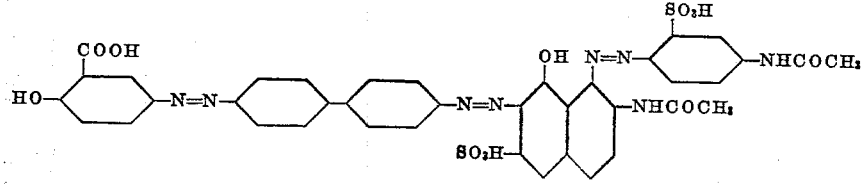

is dissolved in 2000 parts of a 10% sodium carbonate solution and heated for 5 to 7 hours at 90° C. until the acetylamino group being attached to the naphthalene nucleus is split off. Then the solution is cooled to ordinary temperature and the precipitated amino azo dyestuff is separated and dried. It is a brown powder dyeing cotton in yellowish-brown shades which, when aftertreated with copper salts, show good fastness properties to light and to washing. The same dyestuff dyes wool from a weakly acid bath in brown shades of very good fastness to light, to washing and to milling.

Example 4

116 parts of the copper complex compound of the polyazo dyestuff

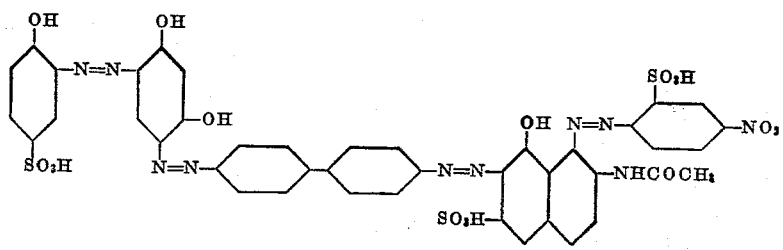

are dissolved in 1200 parts of a 5% sodium carbonate solution and boiled for 4 hours. When the acetylamino group is saponified to $NH_2$ the new dyestuff is salted out with 120 parts of sodium chloride, filtered off and dried. The new dyestuff, a dark powder, dyes cotton in violet brown shades of good fastness to light.

The corresponding uncoppered dyestuff dyes leather in deep dark brown shades possessing, when after-chromed, an excellent fastness to light, to washing and to brushing.

Example 5

120 parts of the diacetylamino-tetrakisazo dyestuff

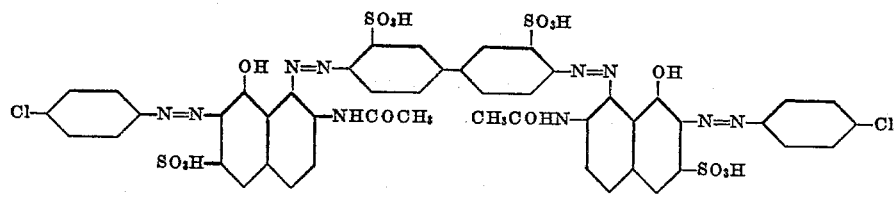

are dissolved in 2500 parts of a 10% sodium carbonate solution and heated for 5 hours at 90° C. When the saponification of the two acetylamino groups is finished, the new dyestuff is precipitated by adding 250 parts of sodium chloride, filtered off and dried. It dyes wool and cotton in fast grey shades.

Example 6

60 parts of the acetylamino disazo dyestuff

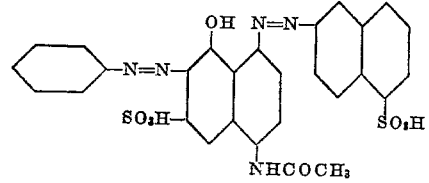

are warmed for a short time in a 5% barium hydroxide solution to 80° C. When the hydrolysis is complete, the solution is cooled to room temperature and the precipitated aminoazo dyestuff filtered off and the barium salt converted in the usual manner into the sodium salt. The thus obtained new azo dyestuff is a dark powder dyeing wool from an acid bath in brown violet shades of very good fastness to light and to washing.

The new dyestuff containing a primary amino group can further be diazotized and coupled with coupling components.

Example 7

90 parts of the acetylamino azo dyestuff

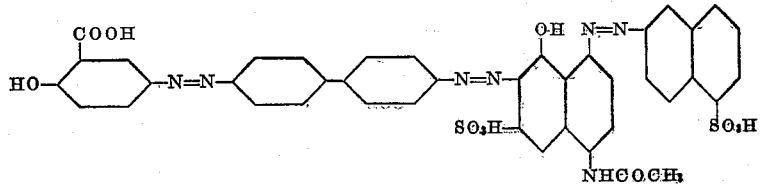

are heated for one hour in a 5 to 10% barium hydroxide solution at 80° C. After cooling to 40° C. the dyestuff is filtered off and converted into the sodium salt. The thus obtained aminoazo dyestuff dyes wool and cotton in dark brown shades. The dyestuff may further be diazotized and coupled with coupling components.

The invention is further illustrated by the different examples given in the following tables.

TABLE 1

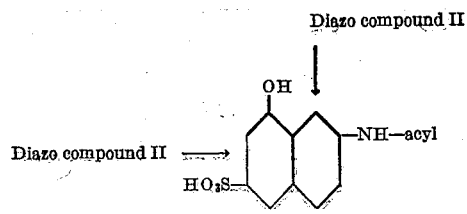

|  | Diazo compound I | Acyl | Diazo compound II | Shade on wool | |
|---|---|---|---|---|---|
|  |  |  |  | Dyestuff with NH.acyl | Dyestuff with NH₂ |
| 1 | Orthanilic acid | Acetyl | Orthanilic acid | Red | Brown-olive. |
| 2 | do | Benzoyl | do | do | Do. |
| 3 | do | p-Toluene-sulfonyl | do | do | Do. |
| 4 | do | Acetyl | 5-acetylamino-2-aminobenzene-1-sulfonic acid | do | Brown. |
| 5 | do | do | 4-(4'-amino-1'-benzoylamino)-1-hydroxy-2-benzoic acid | do | Reddish-brown. |
| 6 | do | do | 4,4'-amino-azo-benzene-sulfonic acid | do | Dark-brown. |
| 7 | Metanilic acid | do | Orthanilic acid | Brown-red | Do. |
| 8 | do | do | 4-(4'-amino-1'-benzoylamino)-1-hydroxy-2-benzoic acid | Red | Brown-red. |
| 9 | Sulfanilic acid | do | Aniline | Brown-red | Reddish-brown. |
| 10 | do | do | Sulfanilic acid | Brown-orange | Brown-red. |
| 11 | do | do | Metanilic acid | do | Do. |
| 12 | do | do | 4-(4'-amino-1'-benzoylamino)-1-hydroxy-2-benzoic acid | Red | Do. |
| 13 | Aniline-2,5-disulfonic acid | do | Aniline | do | Red-brown. |
| 14 | do | do | Metanilic acid | do | Do. |
| 15 | do | do | Sulfanilic acid | do | Do. |
| 16 | do | do | 3-nitroaniline | Orange-red | Brown-red. |
| 17 | do | do | 4-nitroaniline | Red | Brown-olive. |
| 18 | do | do | 4-amino-azo-benzene | Blue-red | Dark-brown. |
| 19 | do | do | Monoazo dyestuff aniline → 1.7-naphthylamine-sulfonic acid | Violet-grey | Do. |
| 20 | 2-nitroaniline | do | Sulfanilic acid | Blue-red | Brown-Orange. |
| 21 | do | do | Naphthionic acid | Brown-violet | Orange-brown. |
| 22 | 4-chloro-5-nitro-2-aminophenol | do | Aniline | Yellow-brown | Red-brown. |
| 23 | do | do | 4-chloro-aniline | do | Do. |
| 24 | 5-amino-2-hydroxy-3-sulfobenzoic acid | do | Orthanilic acid | Red | Brown. |
| 25 | do | do | 4-chloro-aniline | Brown-red | Do. |
| 26 | 5-acetylamino-2-aminobenzene-1-sulfonic acid | do | Orthanilic acid | do | Brown-olive. |
| 27 | do | do | Naphthionic acid | Brown-violet | Black-brown. |
| 28 | do | do | 1-naphthylamine | do | Do. |
| 29 | do | do | 5-acetylamino-2-aminobenzene-1-sulfonic acid | Red | Brown-olive. |
| 30 | do | do | 4-(4'-amino-1'-benzoylamino)-1-hydroxy-2-benzoic acid | Brownish-red | Dark-brown. |
| 31 | do | do | 4,4'-amino-azo-benzene-sulfonic acid | Blue-red | Do. |
| 32 | do | do | Monoazo dyestuff: aniline → 1.7-naphthylamine-sulfonic acid | Grey-violet | Do. |
| 33 | do | do | Orthanilic acid | Red | Black-brown. |
| 34 | do | do | Sulfanilic acid | do | Dark-brown. |
| 35 | do | do | Naphthionic acid | Brown-violet | Black-brown. |
| 36 | do | Benzoyl | do | do | Do. |
| 37 | do | p-Toluene-sulfonyl | do | do | Do. |
| 38 | do | Acetyl | 5-acetylamino-2-aminobenzene-1-sulfonic acid | Red | Do. |
| 39 | do | do | 4-(4'-amino-1'-benzoylamino)-1-hydroxy-2-benzoic acid | Brownish-red | Brown. |
| 40 | do | do | Monoazo dyestuff: aniline → 1.7-naphthylamine-sulfonic acid | Grey | Black-brown. |
| 41 | Naphthionic acid | do | 1-naphthylamine | Red-brown shade on cotton. | Violet-brown shade on cotton. |
| 42 | Orthanilic acid | do | Tetrazo compound of 4.4'-diaminobenzanilide | Brownish-red | Brown. |
| 43 | Aniline-2,5-disulfonic acid | do | Intermediate product made from 4.4'-tetrazodiphenyl + 1 mol salicylic acid. | Blue-red | Yellowish-brown. |
| 44 | do | do | Intermediate product made from 4.4'-tetrazodiphenyl + 1 mol 1-(4'-sulfophenyl)-3-methyl-5-pyrazolone. | Brown-red | Do. |
| 45 | do | do | Intermediate product made from 4.4'-tetrazodiphenyl + 1 mol 1-(4'-sulfophenyl)-5-pyrazolone-3-carboxylic acid. | Blue-red | Do. |
| 46 | do | do | Intermediate product made from 4.4'-tetrazodiphenyl + 1 mol acetoacetanilide. | Reddish-brown | Do. |

TABLE 1—Continued

| | Diazo compound I | Acyl | Diazo compound II | Shade on wool Dyestuff with NH.acyl | Shade on wool Dyestuff with NH₂ |
|---|---|---|---|---|---|
| 47 | 5-amino-2-hydroxy-3-sulfobenzoic acid. | Acetyl | Intermediate product made from 4.4'-tetrazodiphenyl + 1 mol salicylic acid. | Reddish-brown | Brown. |
| 48 | 5-acetylamino-2-aminobenzene-1-sulfonic acid. | ___do___ | [structure: ⬡—N=N—⬡—N=N—⬡—NH₂ with SO₃H, SO₃H] | Bluish-grey | Grey. |
| 49 | ___do___ | ___do___ | Intermediate product made from 4.4'-tetrazodiphenyl + 1 mol salicylic acid. | Brown-violet | Yellowish-brown. |
| 50 | 5-acetylamino-2-aminobenzene-1-sulfonic acid. | ___do___ | Intermediate product made from 4.4'-tetrazobenzanilide + 1 mol salicylic acid. | Violet-brown | Do. |
| 51 | ___do___ | ___do___ | Intermediate product made from 4.4'-tetrazodiphenyl + 1 mol 1-(4'-sulfo-phenyl)-3-methyl-5-pyrazolone. | Brown | Do. |
| 52 | 5-nitro-2-aminobenzene-1-sulfonic acid. | ___do___ | [structure: ⬡—N=N—⬡—N=N—⬡—NH₂ with SO₃H, SO₃H] | Blue-grey | Grey. |
| 53 | ___do___ | ___do___ | Intermediate product made from 4.4'-tetrazodiphenyl + 1 mol salicylic acid. | Violet-brown | Yellowish-brown. |
| 54 | ___do___ | ___do___ | Intermediate product made from 4.4'-tetrazodiphenyl + 1 mol 1-(4'-sulfophenyl)-3-methyl-5-pyrazolone. | Red-brown | Do. |
| 55 | ___do___ | ___do___ | Intermediate product made from 4.4'-tetrazodiphenyl + 1 mol 1-(4'-sulfophenyl)-5-pyrazolone-3-carboxylic acid. | Brown-violet | Dark-brown. |
| 56 | ___do___ | ___do___ | Intermediate product made from 4.4'-tetrazodiphenyl + 1 mol of the metalliferous dyestuff. 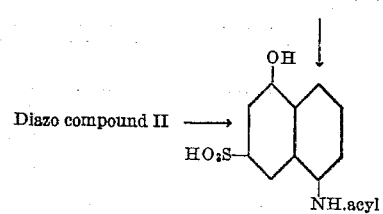 | ___do___ | Violet-brown. |
| 57 | ___do___ | ___do___ | Intermediate product made from 4.4'-tetrazodiphenyl + 1 mol o-cresotic acid. | Violet-brown | Yellowish-brown. |
| 58 | ___do___ | ___do___ | Intermediate product made from 4.4'-tetrazodiphenyl + 1 mol phenol. | Red-brown | Brown. |
| 59 | ___do___ | ___do___ | Benzidine → salicylic acid / 1.7-naphthyl-aminesulfonic acid | Greenish-black | Dark-brown. |
| 60 | ___do___ | ___do___ | Intermediate product made from 4.4'-tetrazobenzanilide + 1 mol salicylic acid. | Violet-brown | Yellowish-brown. |
| 61 | 5-acetylamino-2-aminobenzene-1-sulfonic acid. | ___do___ | CH₃O—⬡—N=N—⬡—N₂.Cl (SO₂CH₃) | Brown-violet | Brown. |
| 62 | Sulfanilic acid | ___do___ | | Brown | Do. |

TABLE 2

Diazo compound II → [naphthol structure with OH, HO₃S, NH.acyl] ← Diazo compound I

| | Diazo compound I | Acyl residue | Diazo compound II | Shade on wool Dyestuff with NH.acyl | Shade on wool Dyestuff with NH₂ |
|---|---|---|---|---|---|
| 1 | 5-nitro-2-aminobenzene-1-sulfonic acid. | Acetyl | 1-naphthylamine | Violet | Dark-brown. |
| 2 | ___do___ | ___do___ | Naphthionic acid | ___do___ | Do. |
| 3 | 2-aminonaphthalene-5-sulfonic acid. | ___do___ | Aniline | Red | Violet-brown |
| 4 | ___do___ | ___do___ | 4-chloro-aniline | ___do___ | Greyish-brown. |
| 5 | 2-aminonaphthalene-5-sulfonic acid. | ___do___ | Intermediate product made from 4.4'-tetrazodiphenyl + 1 mol salicylic acid. | Brownish-red | Dark-brown. |

What we claim is:
1. An azo dyestuff of the formula

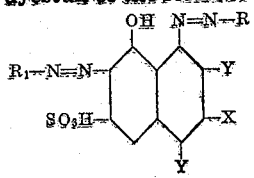

wherein R represents a radical selected from the group consisting of a phenyl radical containing a —SO₃H group in ortho-position to the adjacent azo group and a naphthyl radical containing a —SO₃H group in ortho-position to the adjacent azo group, R₁ stands for the radical of a compound selected from the group consisting of benzene, naphthalene and pyrazolone compounds containing at most two azo groups, X stands for a member selected from the group consisting of hydrogen and SO₃H, one of the Y's being hydrogen and the other Y being NH₂.

2. An azo dyestuff of the formula

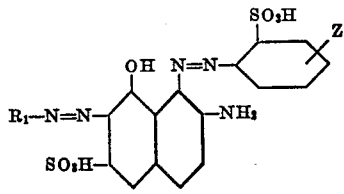

wherein R₁ stands for the radical of a compound selected from the group consisting of benzene, naphthalene and pyrazolone compounds containing at most two azo groups, and Z stands for a member selected from the group consisting of hydrogen, halogen, —NH—acyl, —NO₂ and —SO₃H.

3. An azo dyestuff of the formula

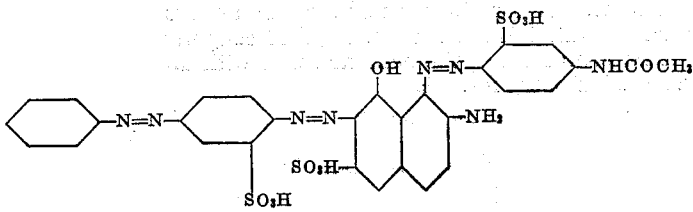

4. An azo dyestuff of the formula

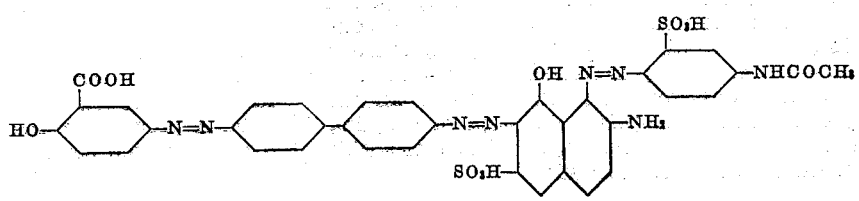

5. An azo dyestuff of the formula

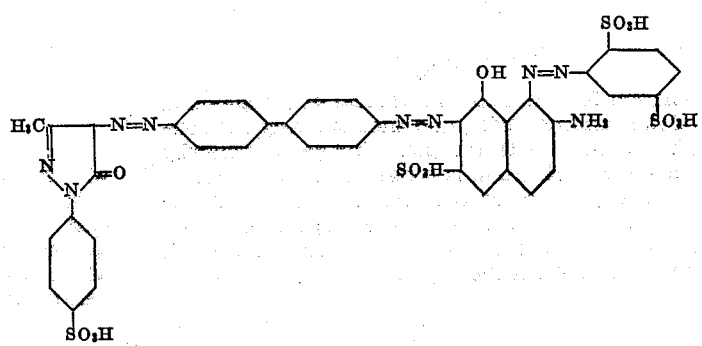

6. An azo dyestuff of the formula

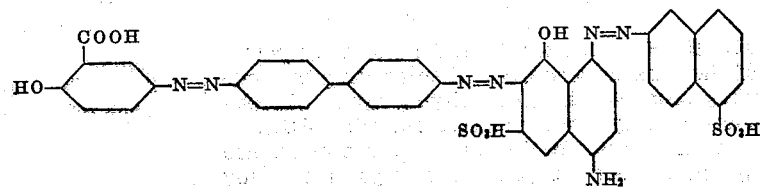

7. An azo dyestuff of the formula

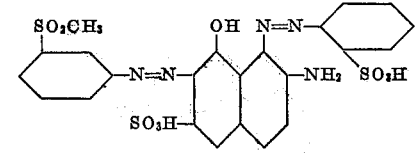

8. A process for the manufacture of an azo dyestuff, which comprises the steps of coupling a diazo compound selected from the group consisting of benzene, naphthalene and pyrazolone diazo compounds with an azo dyestuff of the formula

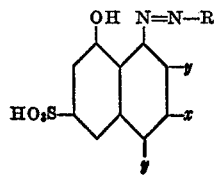

wherein R stands for the radical of a compound selected from the class consisting of compounds of the benzene and naphthalene series, $x$ stands for a member of the group consisting of hydrogen and —SO₃H, one of the $y$'s being hydrogen and the other $y$ being an acylated NH₂ group, and then treating the coupling product with a saponifying agent, whereby the acylated —NH₂ group is converted into —NH₂.

9. A process for the manufacture of an azo dyestuff, which comprises the steps of coupling a diazo compound of the benzene series with an azo dyestuff of the formula

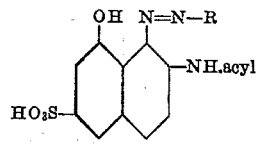

wherein R stands for the radical of a compound of the benzene series, and then treating the coupling product with a saponifying agent, whereby the —NH.acyl group is converted into —NH₂.

10. A process for the manufacture of an azo dyestuff, which comprises the steps of coupling a diazo compound of the naphthalene series with an azo dyestuff of the formula

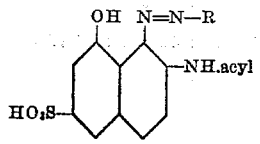

wherein R stands for the radical of a compound of the benzene series, and then treating the coupling product with a saponifying agent, whereby the —NH.acyl group is converted into —NH₂.

11. A process for the manufacture of an azo dyestuff, which comprises the steps of coupling a diazo compound of the pyrazolone series with an azo dyestuff of the formula

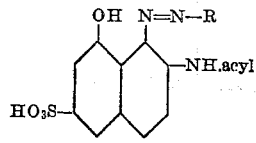

wherein R stands for the radical of a compound of the benzene series, and then treating the coupling product with a saponifying agent, whereby the —NH.acyl group is converted into —NH₂.

12. A process for the manufacture of an azo dyestuff, which comprises the steps of coupling a diazo compound of the benzene series with an azo dyestuff of the formula

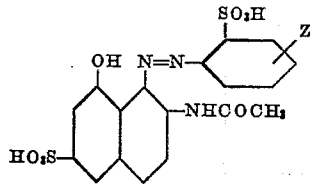

wherein Z stands for a member of the group consisting of hydrogen, halogen, —NH.acyl, —NO₂ and —SO₃H, and then treating the coupling product with an alkaline saponifying agent, whereby the —NHCOCH₃ group on the naphthalene nucleus is converted into —NH₂.

13. A process for the manufacture of an azo dyestuff, which comprises the steps of coupling a diazo compound of the naphthalene series with an azo dyestuff of the formula

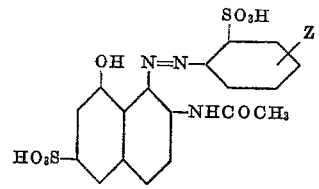

wherein Z stands for a member of the group consisting of hydrogen, halogen, —NH.acyl, —NO₂ and —SO₃H, and then treating the coupling product with an alkaline saponifying agent, whereby the —NHCOCH₃ group on the naphthalene nucleus is converted into —NH₂.

14. A process for the manufacture of an azo dyestuff, which comprises the steps of coupling a diazo compound of the pyrazolone series with an azo dyestuff of the formula

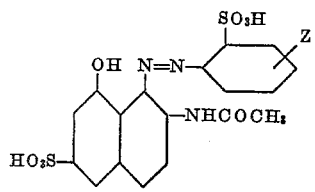

wherein Z stands for a member of the group consisting of hydrogen, halogen, —NH.acyl, —NO₂ and —SO₃H, and then treating the coupling product with an alkaline saponifying agent, whereby the —NHCOCH₃ group on the naphthalene nucleus is converted into —NH₂.

OSCAR KNECHT.
HANS ISCHER.

References Cited in the file of this patent
UNITED STATES PATENTS

| Number | Name | Date |
| --- | --- | --- |
| 2,192,153 | Ross | Feb. 27, 1940 |
| 2,553,261 | Knecht et al. | May 15, 1951 |